July 8, 1958  S. H. PERKY  2,842,071
MANUFACTURE OF SHREDDED CEREAL PRODUCTS
Filed Aug. 6, 1951

INVENTOR
Scott H. Perky
BY Cameron, Kerkam & Sutton
ATTORNEYS

2,842,071

Patented July 8, 1958

2,842,071

MANUFACTURE OF SHREDDED CEREAL PRODUCTS

Scott H. Perky, Winchester, Mass., assignor to National Biscuit Company, New York, N. Y., a corporation of New Jersey Application August 6, 1951, Serial No. 240,539

1 Claim. (Cl. 107—10)

This invention relates to the production of a shredded cereal product of improved texture and appearance by means of improved shredding apparatus comprising particularly a novel type of shredding roll.

Shredded cereals may be marketed in the form of loose shreds, but usually a number of layers of shreds are superimposed to build up "bite size" or larger biscuits. In forming the shreds, cooked and otherwise suitably prepared grain such as wheat, corn and the like is usually passed between two rolls rotating in pressure contact with one another, one of the rolls having circumferential grooves into which the material is pressed and from which it is then removed in the form of continuous shreds of indefinite length. Normally the ribs or lands between the grooves of the roll are somewhat narrower than the grooves themselves, thus reducing the pressure between the rolls and increasing the output per square inch of roll surface. However, this arrangement also sacrifices quality of the final product to a considerable extent by reducing openness of texture and by minimizing kneading action and elastic expansion natural to properly cooked and tempered grain. Moreover, as the closely adjacent shreds are removed from the roll and formed into biscuits, they often touch and adhere to one another, such bunched shreds offering a tough resistance to chewing which is undesirable and does not conduce to thorough mastication.

The disadvantages mentioned above can be avoided by the use of a roll of the type disclosed in my prior Patent No. 1,566,771 in which the narrow circumferential ribs or lands between the grooves are recessed or notched at points closely spaced around their peripheries, thereby forming a sheet or ribbon having relatively small and substantial rectangular openings between longitudinally and transversely extending lengths or strands. Such a sheet or ribbon breaks easily at the intersections of these strands into small particles, thus forming biscuits and like products having a delicate flaky texture. However, the use of a roll of this type involves a difficult problem of maintenance due to fairly rapid wear of the edges of the tooth-like projecting portions of the lands which extend between the circumferentially spaced notches and which form the openings in the sheet or ribbon. Unless these edges are kept sharp, the openings in the ribbon are not clean-cut and are often closed partially or even entirely by webs which detract from the desired flakiness of texture and result in poor eating quality. Moreover, many consumers still prefer the quite different but familiar texture of the usual product comprising a group of simple shreds, although it offers much greater resistance to spoon pressure and chewing and more often than not is crumbled by hand before being eaten.

The present invention provides a novel and improved roll construction which substantially eliminates the above mentioned problem of wear and at the same times is capable of producing a product of the usual longitudinally shredded type but having a more open structure of separated unbunched shreds and a more tender friable texture with attendant improvements in eating quality and appearance.

The invention can best be explained in detail by reference to an illustrative embodiment thereof such as that shown in the accompanying drawings. However, it should be understood that this embodiment is by way of example only an that the drawings are not to be construed as a definition of the limits of the invention, reference being had to the appended claim for this purpose.

Figure 1:
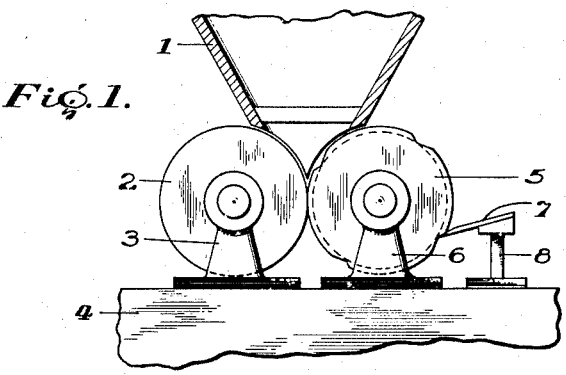
Fig. 1 is a somewhat diagrammatic illustration of a shredding apparatus embodying the invention.

Referring first to Fig. 1, the grain to be shredded, after having been cooked, tempered, etc., in any conventional manner, is charged into a hopper 1 from which it passes between two rolls rotating in pressure contact (approximately 1700 pounds) with one another. As shown, the left-hand roll 2 is smooth and is mounted for rotation in suitable bearing brackets 3 on a bed or table 4. The right-hand roll 5 is mounted to rotate in similar bearing brackets 6 and is provided with circumferential lands and grooves as described hereinafter. The grain passing between the rolls is compressed into these grooves to form shreds which remain in the grooves until they reach the teeth of a suitable comb 7 mounted on a standard 8 on the table 4, whereby the shreds are removed from the grooves in a well known manner.

Figure 3:
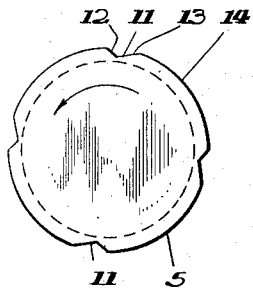
Fig. 3 is an end view of Fig. 2.
Figure 2:
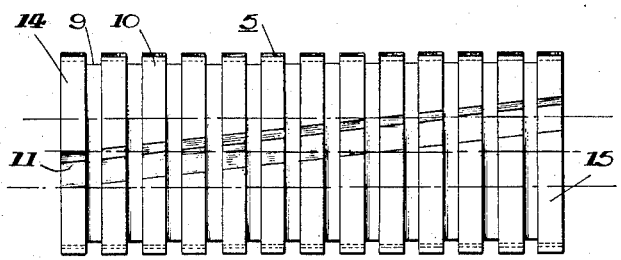
Fig. 2 is a side view of the grooved shredding roll.

The construction of the shredding roll 5 is shown in detail in Figs. 2 and 3. The roll is provided with a plurality of parallel circumferential grooves 9 separated by intervening ribs or lands 10. As disclosed in the prior patent mentioned above, the grooves 9 may have any desired cross sectional shape and as shown are rectangular.

Each of the lands 10 is provided with a plurality of recesses or notches 11 that are rather widely spaced from one another around the periphery of the land for reasons explained below, and as here shown are four in number. Each of the notches is formed by oppositely inclined surfaces 12 and 13, the trailing surface 13 preferably having a more gradual slope than the leading surface 12 to minimize fracture or breakage of the transverse strands of cereal as they are removed from the notches 11 by the action of the comb 7. Also the bottoms of the notches 11 preferably are slightly above the bottoms of the adjacent grooves 9 in order to facilitate the removal of the shredded structure from the roll.

As clearly shown in Fig. 2, the notches 11 in the successive ribs or lands 10 are arranged in a row extending in a non-axial direction, or in other words at an angle to a generatrix of the substantially cylindrical roll. Since contact between the rolls 2 and 5 occurs only along a line parallel to the axes of rotation of the rolls, said line of contact always coincides with a generatrix of the roll 5. The minimum angle which the row of notches 11 makes with a generatrix of the cylinder, or in other words with said line of contact, is such that for any desired circumferential length of the notches 11 and for any given length of the roll 5, the trailing end or edge of a section 14 of the land at one end of the roll overlaps circumferentially the leading end or edge of a section 15 of the land at the other end of the roll. It will therefore be seen that any generatrix of the cylindrical roll and any lines of contact cross at least one of the lands 10.

At any smaller angle between the row of notches 11 and a generatrix of the roll, the line of contact between the two rolls would pass entirely through the depressions formed by the notches. Hence the smooth roll 2 would, so to speak, fall into the row of notches because of the pressure between the rolls, riding over the ends of the land sections 14 and 15 with a sort of hammering effect and producing excessive wear of these edges. A larger angle than that shown in Fig. 2 can be used if desired, in which case the line of contact between the rolls may cross a larger number of land sections, but in this case there may be undue variation in the depth of the notches 11 unless special means are employed to control the path of the cutting tool. At or near the minimum angle mentioned above, however, the notches can be milled or otherwise cut by a tool traveling in a straight line, the variation in depth of the notches being negligible.

In order to keep the shreds formed in grooves 9 well separated and to provide a more open texture of the eventual biscuit, the lands 10 are preferably somewhat wider than the grooves 9 contrary to the usual practice mentioned above. For example, if the width of the grooves 9 is in the customary range of 0.02–0.025 inch, the width of the lands 10 may be in the approximate range of 0.03–0.06 inch. Also the transverse strands formed in the notches 11 serve to keep the shreds separated and to prevent bunching. Hence although the capacity of the roll is decreased somewhat, the resulting product is much superior to the conventional shredded product both with regard to its absorptiveness and with respect to its eating qualities. On the other hand, the characteristics of the usual type of longitudinally shredded product are preserved due to the relatively large circumferential spacing of the notches 11. In combination with the dimensions mentioned above, for example, the circumferential length of the projecting portions 14 and 15 of the lands is preferably at least 0.25 inch and may be as much as ½ inch or even 1 inch. The transverse strands are thus spaced too far apart to result in any substantial alteration of the characteristic longitudinally shredded texture of the product.

Figure 4:
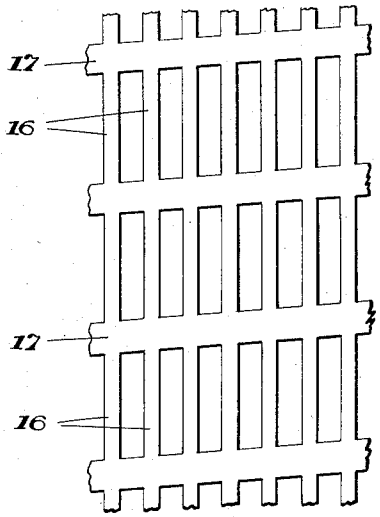
Fig. 4 illustrates the preferred structure of the product produced by the shredding apparatus.

Fig. 4 shows the product formed by a roll of the type described above. The longitudinal shreds 16 are removed more or less continuously from the grooves 9 of the roll in any desired length. They are spaced apart by a distance substantially greater than their thickness to provide the desired open texture of the eventual biscuit, and they are maintained in this widely spaced and substantially parallel relation by the transverse strands 17 formed in the notches 11. The shreds 16 break more easily at their junctions with the transverse strands 17 and this contributes to the ease with which the product can be cut by a spoon and eaten. But the transverse strands 17 are so widely spaced from one another that the eventual biscuit takes on the nature and characteristics of a longitudinally shredded product from the standpoint of both appearance and eating qualities.

It will be understood that the invention is not restricted to the embodiment particularly described above and illustrated in the drawings, and that various changes can be made in the form, details of construction and proportion of parts without departing from its spirit. Reference should therefore be had to the appended claim for a definition of the limits of the invention.

What is claimed is:

A substantially cylindrical roll for making shredded cereal products comprising a plurality of circumferential grooves separated by intervening lands, said lands having circumferentially spaced recesses extending between the adjacent grooves and intervening non-recessed sections adapted to rotate in pressure contact with an adjacent roll, the recesses in successive lands being aligned in a non-axial row and the trailing edge of a land section at one end of the roll circumferentially overlapping the leading edge of a land section at the other end of the roll.

References Cited in the file of this patent
UNITED STATES PATENTS

| | | |
|---|---|---|
| 1,566,771 | Perkey | Dec. 25, 1925 |
| 1,707,477 | Hungerford | Apr. 2, 1929 |
| 2,013,003 | Loose | Sept. 13, 1935 |
| 2,405,661 | MacManus | Aug. 13, 1946 |